Figure 1:
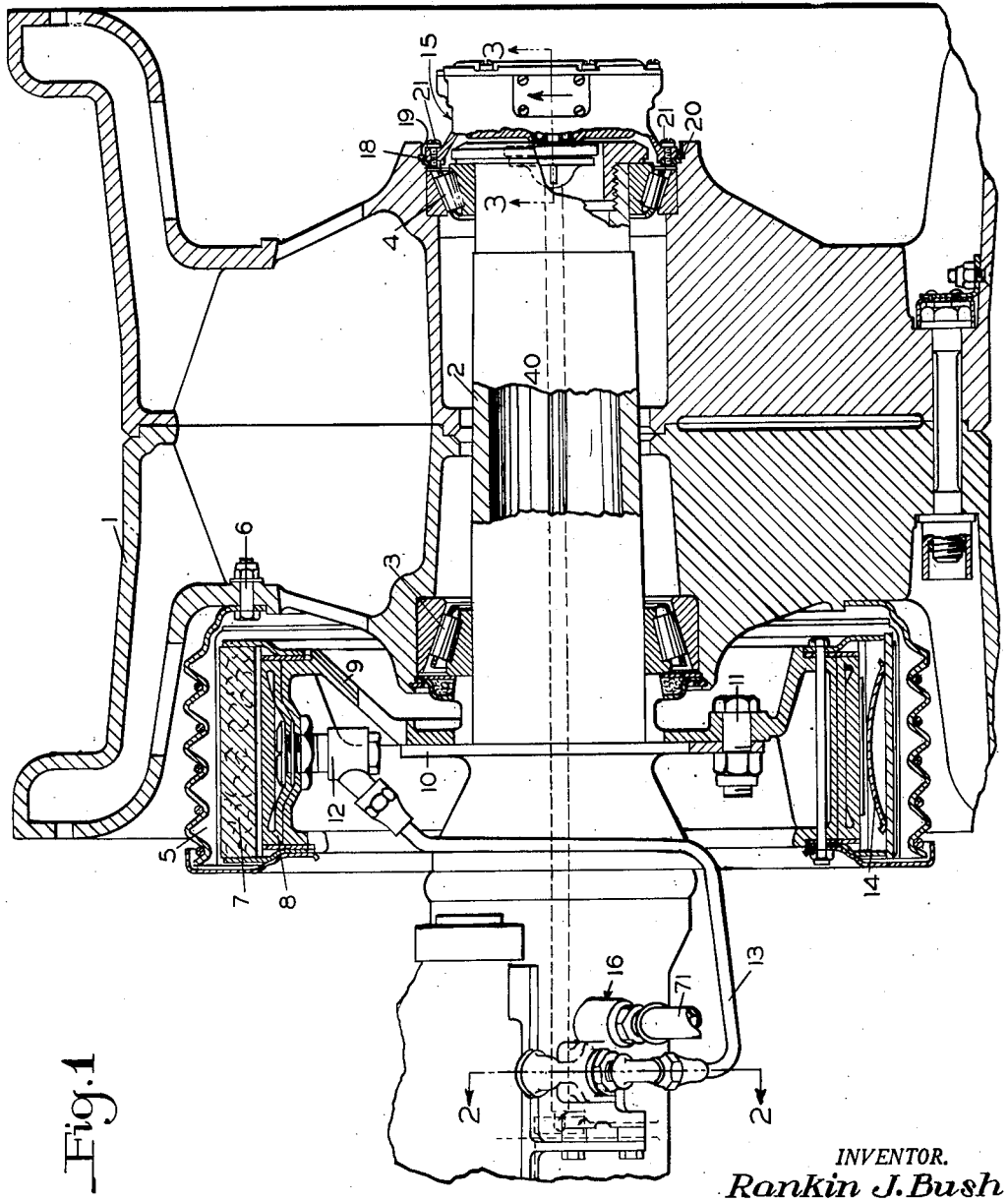

Oct. 30, 1951  R. J. BUSH  2,573,387
INERTIA OPERATED CONTROL DEVICE
Filed Aug. 31, 1949  2 SHEETS—SHEET 2

INVENTOR.
Rankin J. Bush
BY
Frank E. Miller
ATTORNEY

UNITED STATES PATENT OFFICE 2,573,387

INERTIA OPERATED CONTROL DEVICE

Rankin J. Bush, Greensburg, Pa., assignor to Westinghouse Air Brake Company, a corporation of Pennsylvania Application August 31, 1949, Serial No. 113,352

11 Claims. (Cl. 264—1)

This invention relates to an inertia operated control device for control of the brakes of vehicles and, more particularly, to an improved inertia operated control device of the rotary type for controlling the application of brakes on the landing wheels of airplanes in such a manner as to prevent sliding of the landing wheels due to brake application.

As is well known, airplanes necessarily travel at relatively high speeds in landing. Consequently the landing wheels of an airplane are accelerated very rapidly either from a non-rotative condition or an initially low rotative speed (if the landing wheel tires are provided with accelerating flaps or other means for that purpose) at the instant of contact of the wheel tires with the runway. For a certain time after the first contact of the landing wheel tires with the runway, the airplane may bounce vertically in repeated succession due to the unevenness of the runway or the varying lift on the wings of the airplane, thus producing a wide variation of the force pressing the wheels to the ground and in some cases even lifting the wheels clear of the runway.

It will thus be seen that for a certain interval of time after the first instant that the landing wheels touch the runway or ground, it is not practical for the pilot of the airplane to effect an application of the brakes on the wheels because during the interval of light load or absence of load on the wheels the degree of brake application established inevitably effects locking of the wheels. Thus, recontact of the wheels as the airplane settles to the ground causes slipping or sliding of the wheel tires. Slipping or sliding of the wheel tires is objectionable in that it causes rapid wearing away of the tire surface which ultimately destroys the tire, and in some cases causes tire blowouts resulting in upsets and damage to the airplane.

As used herein, the terms "slipping" and "sliding" applied to the landing wheels of an airplane are not synonymous. The term "slip" and its variations, as employed herein, identify a rotating condition of the landing wheel in contact with the ground in which the peripheral speed of the wheel at a given instant varies from the linear or ground speed of the airplane. The term "slide" and its variations, as used herein, refers to the dragging of a landing wheel along the runway or ground in contact therewith while the wheel is locked or not rotating.

In order to avoid, as much as possible, the undesired slipping or sliding of the wheel tires on landing, the pilot of an airplane customarily delays effecting a brake application for a certain interval of time—sometimes as much as six seconds—following the initial contact of the landing wheels with the ground. Where the length of the runways on a landing field is sufficient, the delay in effecting the brake application is not necessarily disadvantageous. However, where the runway is unusually short it is quite difficult and sometimes impracticable to land an airplane requiring a long stopping distance, particularly in the case of larger airplanes having extra high landing speeds.

It is desirable, therefore, to provide means whereby to minimize as much as possible, the delay period required following the instant of initial contact of the landing wheels of the airplane with the runway or ground, before a brake application on the landing wheels may be safely effected. It has previously been proposed, therefore, to employ rotary inertia devices which recognize the slipping condition of the landing wheels and which operate to automatically effect a release of a brake application on the wheels, initiated by the pilot of the plane, thereby to prevent the locking of the landing wheels and the sliding thereof, so as to enable the brake application to be effected on the landing wheels as rapidly as possible after the first contact of the wheels with the runway.

One type of rotary inertia device heretofore proposed for this purpose is shown and described and claimed in the copending application of Charles W. Berkoben and Rankin J. Bush, Serial No. 51,546, filed September 28, 1948 and assigned to the assignee of the present application. This type includes a friction clutch in the driving mechanism for the inertia element or mass of the device, which clutch device serves to prevent damage to the parts of the inertia device due to forces generated upon sudden acceleration or deceleration of landing wheels.

The single friction clutch type of drive for the inertia element of a rotary inertia device employed for the control of airplane brakes is subject to the disadvantage that if the frictional force exerted by the clutch is sufficient to effect rapid acceleration of the inertia element back toward a wheel speed corresponding to the ground speed of the airplane at a rapid rate, then an excessively rapid rate of deceleration of the inertia element during the deceleration portion of the slipping cycle or period occurs which may result in the undesired premature reapplication of the brakes during the wheel slip period. On the other hand, if the frictional force exerted by the single clutch is light enough so as not to cause an unduly rapid rate of deceleration of the inertia element during the deceleration portion of the slipping period of the landing wheel, the acceleration of the inertia element back toward a wheel speed corresponding to the ground speed of the airplane is unduly delayed and, consequently, the reapplication of the brakes following return of the landing wheel to the ground speed of the airplane is unduly delayed.

Where a single clutch type of drive is employed, therefore, it is necessary to adopt a compromise degree of frictional force. Consequently, due to the compromise degree of frictional force exerted by the single clutch, reapplication of the brakes under the control of the inertia device is somewhat delayed following the restoration of a slipping landing wheel to a speed corresponding to the ground speed of the airplane, thus undesirably lengthening the stopping distance of the plane.

It is accordingly one object of my present invention to provide an improved rotary inertia device for the control of the brakes on the landing wheels of airplanes, characterized by a type of drive for the inertia element of the device which functions to materially reduce the delay, inherently caused by heretofore known rotary inertia devices, following the restoration of a slipping landing wheel to the ground speed of the airplane before reapplication of the brakes on the landing wheel may be effected, while retaining the advantage of preventing damage to parts of the inertia device due to forces generated upon rapid acceleration or deceleration of the landing wheels.

Another and more specific object of my invention is to provide an improved rotary inertia device, of the type mentioned in the foregoing object, characterized by a multiple clutch type of drive arrangement for the inertia element which functions automatically to cause deceleration of the inertia element at a relatively slow rate during the deceleration part of the wheel slip period and which also causes acceleration of the inertia element at a rapid rate during the acceleration portion of the wheel slip period.

Another object of my invention is to provide an improved rotary inertia device, of the type mentioned in the foregoing objects, characterized by a multiple friction type of drive for the inertia element in which only one clutch is effective during the deceleration portion of the slipping period of the landing wheel and in which both clutch devices are effective during the acceleration portion of the slipping period of the landing wheel.

Figure 2:
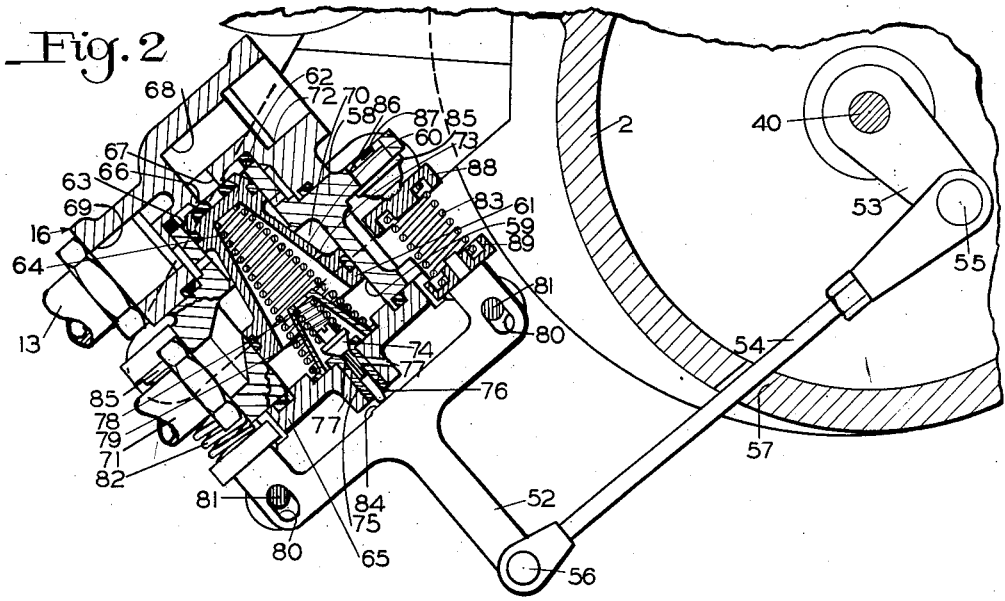
Figure 3:
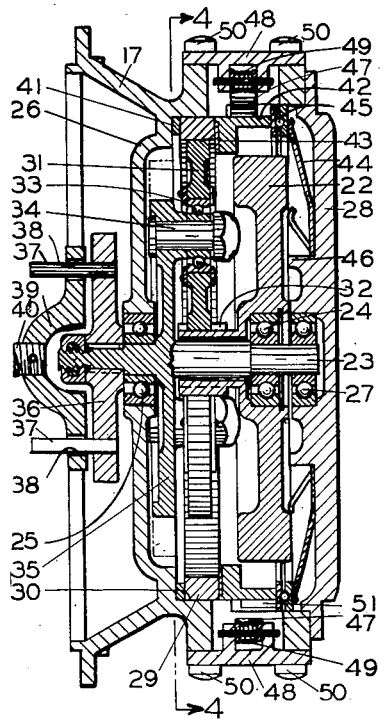
Figure 4:
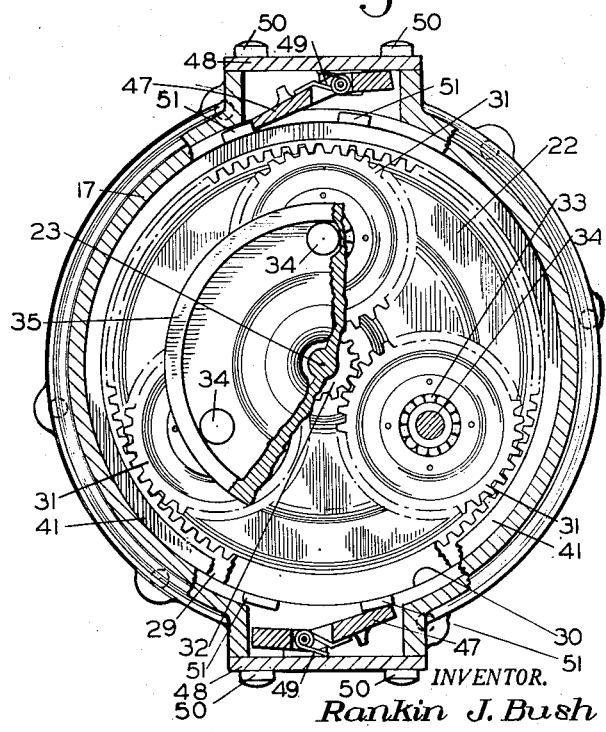

Other and more detailed objects of my invention will appear in the following description thereof when read in conjunction with the accompanying drawings, wherein, Fig. 1 is a fragmental horizontal cross-section view of a conventional airplane wheel assemblage, showing one embodiment of my improved rotary inertia device applied thereto, Fig. 2 is an enlarged fragmental cross-sectional view, taken substantially on the line 2—2, of Fig. 1, Fig. 3 is an enlarged cross-sectional view, taken on the line 3—3 of Fig. 1, showing details of my improved rotary inertia operated device, Fig. 4 is a sectional view, taken on the line 4—4 of Fig. 3, with parts broken away for clarity, showing further construction details.

Referring to Fig. 1, the airplane wheel assemblage shown comprises a wheel 1, the usual pneumatic tire for which is now shown, which wheel is rotatively mounted in conventional manner on a tubular non-rotative axle 2 through the medium of suitable bearings 3 and 4 disposed respectively at opposite ends of the wheel hub.

The brake mechanism for braking wheel 1 comprises a cylindrical brake drum 5 attached at one end, as by securing bolts 6, to the inner web of the landing wheel, an annular segmented brake shoe 7 disposed within and surrounded by the drum 5, and an expansible and contractable brake tube 8 for operating the shoe 7.

The annular brake shoe 7 is supported and guided, for radial movement into and out of engagement with the inner surface of the brake drum 5, on the periphery of an annular support member 9 of dish-shape, the member 9 having a central hub portion through which the axle 2 extends and being attached to a radially extending flange 10 on the axle 2, as by a plurality of bolts 11, only one of which is shown.

The annular brake tube 8 is supported by the member 9 in concentric relation within the annular brake shoe 7, the brake tube being provided with a suitable fitting 12 whereby a pipe 13 is connected to the tube for the purpose of supplying fluid under pressure to the interior of the tube and releasing it therefrom.

Suitable release springs, illustrated as curved leaf springs 14, are interposed between the support member 9 and the segments of the annular brake shoe 7 in such a manner as to bias the brake shoe segments normally radially inwardly to a release position out of engagement with the inner surface of the brake drum 5. Introduction of fluid at sufficient pressure to the interior of the brake tube 8, expands the tube and applies a radial pressure uniformly on the segments of the brake shoe 7 to thereby effect engagement thereof with the brake drum 5, in opposition to the yielding force of the springs 14.

According to my invention, the brake control apparatus provided comprises my improved rotary inertia device 15, and a so-called release valve device 16 controlled by the rotary inertia device 15 and effective to control the supply of fluid under pressure to or the release of fluid under pressure from the pipe 13 leading to the brake tube 8.

The rotary inertia device 15 comprises a suitable casing 17, generally cylindrical in appearance, having a flange at one end whereby to secure the device to the outer end of the hub of the landing wheel 1. Various expedients may be resorted to in securing the device 15 to the wheel 1, depending upon the type of the landing wheel and the construction thereof. In the type of landing wheel shown, however, the means provided for securing the casing 17 to the hub of the landing wheel 1 so as to rotate therewith, includes a ring 18 secured in the bore 19 in which the races or rings of the bearing 4 are received, as by a split lock-ring 20, the flange at one end of the casing 17 being attached to the ring 18 as by plurality of bolts or screws 21.

The mechanism of the rotary inertia device 15 comprises an inertia element or mass, shown in the form of a fly-wheel 22, rotatably mounted, as by a bearing 24, on a shaft 23. Shaft 23 is rotatably mounted at one end in the casing 17, as by a bearing 25 in an inner wall 26 of the casing, and at the other end by a bearing 27 carried in a suitable recess on the inner face of a removable cover 28, which is adapted to be secured to and close the outer end of the casing 17.

The mechanism for driving the fly-wheel 22 comprises an orbit gear 29 having teeth on the inner surface thereof and machined to a smooth surface on the outer periphery thereof, the orbit gear being contained in close-fitting relation a suitable smooth bore 30 in the casing and capable of rotation in the bore with respect to the casing.

The orbit gear 29 is frictionally held in the casing for rotation therewith by a multiple clutch arrangement constituting a special feature of my invention and which will be presently described.

A driving connection between the orbit gear and the fly-wheel 22 is provided through the medium of a plurality of planetary gears 31 shown as three in number, that mesh externally with the orbit gear and internally with a sun gear 32 formed on or attached to the projecting end of the hub of the fly-wheel 22.

The planetary gears 31 are mounted for rotation in the same plane, as by suitable ball bearing races 33, on bolts 34 attached in equal angularly spaced relation and equidistant from the axis of the shaft 23 to a radially extending disc-like flange 35 formed integrally with the shaft 23.

The inner end of the shaft 23 projects out through the wall 26 and a disc 36 is secured thereto for rotation therewith as by a key and keyway. The disc 36 has a plurality of pins 37, shown as two in number, disposed in diametrical relation for engaging in suitable holes 38 of a disc-like yoke 39 attached to one end of an operating rod 40.

The multiple clutch arrangement, previously mentioned, for holding the orbit gear 29 so as to rotate with the casing 17, comprises, according to my invention, a friction or clutch ring 41 interposed at the base of the bore 30 between a cooperating clutch face formed on the wall 26 and the adjacent cooperating side of the orbit gear 29. The multiple clutch arrangement further comprises an annular clutch member 42, disposed on the side of the orbit gear 29 opposite to clutch ring 41 and having attached thereto a friction or clutch ring 43 for engaging the adjacent side of the orbit gear 29. One or more spring members 44 (only one being shown) serve to exert an axial force through the medium of a thrust bearing 45 on the clutch member 42 whereby to effect the gripping engagement of the orbit gear 29 between the clutch rings 41 and 43, and at the same time exert a force pressing the friction ring 41 into frictional contact with the clutch face formed on the wall 26 of the casing 17.

Although only one spring 44 is shown, it will be understood that one or more of such spring members may be employed, depending upon the force required to be exerted thereby. As shown, the spring member 44 is in the form of a central ring portion from which radiate in spoke-like relation a plurality of resilient fingers, the tip ends of which engage the outer bearing ring or race of the thrust bearing 45. The central ring portion of the spring member 44 is supported on a central projection or shoulder 46 formed on the inner face of the cover 28 in surrounding relation to the bearing 27.

According to my invention, I provide an arrangement for automatically locking and unlocking the clutch member 42 to the casing 17 whereby selectively to cause exertion of a frictional force by the clutch ring 43 on the orbit gear 29 or the removal of such frictional force upon rotation of the casing 17.

As will be seen particularly in Fig. 4, the mechanism which I provide for selectively locking and unlocking the clutch member 42 with respect to the casing 17 comprises a plurality of latch members or latches 47, illustrated as two in number, pivotally carried on so-called latch covers 48 disposed in substantially diametrical relation on opposite sides of casing 17. Each latch member 47 is biased by a spiral spring 49 in such a manner as to engage the outer peripheral surface of the clutch member 42. The latch covers 48 are removably secured to the casing 17 as by a plurality of screws 50 and may be reversed in position to suitably orient the latch members 47 with respect to the head end of the airplane so as to operate similarly for wheels on the left or right side of the airplane.

The outer periphery of the clutch member 42 is provided with a clutch surface illustrated in the form of a plurality of projecting lugs 51 equally spaced around the periphery of the clutch member against which lugs the latches 47 are biased. In the position of the latches 47 shown in Fig. 4, rotation of the casing 17 in a counterclockwise direction will cause one or both of the latches to drop down into the recess between successive lugs 51 and engage the side surface of the lugs, to provide a positive lock whereby the rotation of the casing 17 effects a corresponding positive rotation of the clucth member 42. Conversely, upon rotation of the casing 17 in a clockwise direction, as seen in Fig. 4, the latches 47 raise as they strike the lugs 51 and consequently free rotation of the casing 17 with respect to the clutch member 42 is permitted.

It will thus be seen that, for one direction of rotation of the casing 17 with respect to the clutch member 42, the clutch member is locked for rotation with the casing and consequently, renders the clutch ring 43 effective to grip the orbit gear 29. Consequently, it will be seen that under such circumstances a high degree of driving torque may be exerted to drive the orbit gear in synchronism with the casing 17 because both the clutch rings 41 and 43 will be effective to grip the orbit gear 29. It will also be seen that when the casing 17 rotates in the opposite direction with respect to the clutch member 42, the clutch member and clutch ring 43 rotate free of the casing except for the negligible friction in the thrust bearing 45. Consequently, in such case, only the clutch ring 41 is effective to transmit a driving torque from the casing to the orbit gear 29, thereby limiting the driving torque applied to the orbit gear 29 to a relatively low value compared to that to which the driving torque is limited when both clutch rings 41 and 43 are effective.

It will be apparent that when the casing 17 is rotatively accelerated, the orbit gear 29 exerts a driving torque to accelerate the fly-wheel 22 to to a degree limited by the frictional force of both clutch rings 41 and 43. Due to the reaction of the forces exerted on the planetary gears 31 upon rotative acceleration of the casing 17, the flange 35 shifts rotatively in one direction out of a certain normal non-rotative position in which it is held, as explained hereinafter, to thereby effect rotation of the operating rod 40 correspondingly. It will also be seen that upon rotative deceleration of the casing 17, the reactive forces exerted on the planetary gears 31 due to the inertia effect of the flywheel 22 causes the flange 35 to be rotatively shifted in the opposite direction out of its normal position to thereby effect a corresponding rotation of the operating rod 40. Further operation of the rotary inertia device 15 will be made apparent in the subsequent description of the entire apparatus.

Referring to Fig. 2, there is shown the operative connection between the operating rod 40 and the operating lever 52 of the release valve device 16, whereby rotation of the operating rod 40 effects operation of the release valve. It will be seen that operating rod 40 extends coaxially within the tubular axle 2 from the rotary inertia device 15 and has secured thereto, for the purpose mentioned, a rocker arm 53 also within the tubular axle 2, the end of the rocker arm having one end of a connecting link or link rod 54 connected thereto as by a pin 55 and the opposite end of the link rod 54 being pivotally connected as by a pin 56 to the outer end of the operating lever 52. The release valve 16 is supported on a suitable bracket on the outside of the axle 2, and thus a suitable slot or passage 57 is provided in the wall of the axle through which the link rod 54 extends.

The release valve 16, as shown in Fig. 2, comprises a casing 58 having a central bore 59 therein, containing a piston valve device 60. Piston valve 60 comprises an annular piston 61 operative in the bore 59 and a piston valve 62 operative in a bore 63 coaxially related to the bore 59 and of smaller diameter. Piston 61 and piston valve 62 are preferably formed at opposite ends of a tubular member which is closed at the end at which the piston valve 62 is located and open at the end at which the piston 61 is located. A coil spring 64 interposed between the closed end of the tubular member and the inner face of a cover 65, closing the open end of bore 59, yieldingly biases the piston valve device 60 to a position in which the piston valve 62 seats on an annular rib seat 66 to close a port 67 through which a connection is established, as explained hereinafter, between an exhaust passage 68 and a passage 69. Pipe 13 leading to the brake tube 8 is suitably connected to the passage 69.

Formed within the bore 59 between the piston 61 and piston valve 62 is an annular chamber 70 to which is connected a fluid pressure supply pipe 71. A brake controlling valve device (not shown) of conventional self-lapping type located in the pilot's compartment of the plane serves to control the supply of fluid under pressure to the pipe 71.

With the piston valve 62 in its seated position as shown in Fig. 2, communication is established from the annular chamber 70 through a plurality of ports 72 to the passage 69 and pipe 13. It will thus be apparent that fluid under pressure supplied to the pipe 71 under the control of the brake controlling valve device in the pilot's compartment may flow to the brake tube 8 to effect expansion thereof and a consequent application of force pressing the annular brake shoe 7 into frictional engagement with the inner surface of the brake drum 5, thereby effecting a brake application on wheel 1.

The tubular member connecting the piston 61 and piston valve 62 is provided with one or more ports 73 through which fluid under pressure supplied from the pipe 71 to the annular chamber 70 may flow at a restricted rate to the interior of the tubular member and to the chamber within the bore 59 at the outer face of the piston 61.

The release valve 16 further comprises a pilot valve 74 of the poppet type cooperating with a valve seat bushing 75 secured in a central bore 76 in the cover 65. The pilot valve 74 is provided with a fluted stem which extends slidably through the central bore of the valve seat bushing 75 and the end of which projects beyond the outer face of the cover plate 65. A plurality of exhaust ports 77 opening out of the interior of the valve seat bushing and extending to the exterior of the cover provide for the exhaust of fluid under pressure from the chamber on the outer face of the piston 61 upon the unseating of the valve 74.

Valve 74 is yieldingly biased to a seated position on the inner end of the valve seat bushing 75, as by a coil spring 78 interposed between a spring retainer 79 and the valve. The spring retainer 79 has a flange at one end which fits into a recess on the inner face of the cover 65 and against which the one end of the spring 64 presses to hold it in place.

The operating lever 52 of release valve 16 is of T-shape, having two arms extending in opposite directions from the portion to which the link rod 54 is connected, each of the arms having near the end thereof a slot 80 through which a suitable pin or lug 81 attached to the casing 58 extends. Two similar springs 82 and 83 are provided for exerting a spring force on the ends of the arms of the operating lever 52 respectively to bias it to a central normal position, as shown in Fig. 2, wherein a boss or contact surface 84 on the lever disengages the end of the fluted stem of the pilot valve 74 to allow seating of the pilot valve 74. The tension of the springs 82 and 83 may be adjusted to provide more or less force, as desired, by means of adjusting nuts 85. Nuts 85 have smooth portions fitted into and rotatable in bores 86 in the casing 58, which nuts when turned shift cooperating screws 87 having spring seats 88 secured thereto in which one end of each of the springs 82 and 83 is received. Suitable annular spring seats 89 may also be provided at the ends of the crossarms of lever 52, as shown, for receiving the opposite ends of the springs 82 and 83 respectively.

It will thus be seen that springs 82 and 83 may be individually adjusted to determine the amount of force required to rotarily shift the flange 35 of the rotary inertia device 15 from its normal position for the purpose of unseating the pilot valve 74 and thereby effect the unseating of the piston valve 62 in the manner hereinafter to be described. Springs 82 and 83 are so tensioned that unseating of the valve 74 is effected whenever the torque force exerted on flange 35 exceeds a certain value occurring in response to deceleration and acceleration of the landing wheel and casing 17 at an excessive rate occurring only incident to a wheel slip condition. It will be apparent also that the flange 35 is maintained in its certain non-rotative normal position by the action of the springs 82 and 83 acting through the lever 52, the link 54, the rocker arm 53 and the operating rod 40.

While, for simplicity, only one landing wheel assembly is shown in the drawings, it should be understood that each landing wheel of an airplane is intended to be similarly provided with a rotary inertia device 15 and release valve 16 and to be controlled in the manner now to be described for the one landing wheel shown.

In operation, let it be assumed that an airplane having the landing wheel 1 is coming in for a landing and that the tire on wheel 1 contacts the runway or ground surface. Wheel 1 and consequently the casing 17 of the rotary inertia device 15 is correspondingly rapidly accelerated toward a rotational speed corresponding to the ground speed of the airplane. Let it be assumed that rotation of the wheel in the forward direction corresponds to rotation of the casing 17 in a counter-clockwise direction, as seen in Fig. 4. The latches 47 engage one or more lugs 51 on the clutch member 42 and lock the clutch member for rotation with the casing. The orbit gear 29 is thus impelled to rotate with the casing 17 by the frictional force exerted thereon by the two clutch rings 41 and 43. If the driving force or torque exceeds the limit of the friction of the two clutch rings 41 and 43, the orbit gear 29 will slip with respect to the casing 17, thus limiting the amount of torque force which may be exerted to accelerate the flywheel 22 to a degree corresponding to the frictional force exerted, and preventing damage to the parts of the mechanism, especially the teeth of planetary gears 31 and orbit gear 29.

Due to the reactive forces on the flange 35 by reason of the tendency of the flywheel 22 to lag behind the orbit gear 29, the flange 35 is rotationally urged out of its normal position to effect a corresponding rotational urge on the operating rod 40. Under the assumed circumstances, the flange 35 will be urged in a counter-clockwise direction, as seen in Fig. 4, and the operating rod 40 and the rocker arm 53 will be correspondingly urged rotationally in a clockwise direction, as viewed in Fig. 2, thus exerting a push on the link rod 54 and rocking the lever 52 of the release valve 16 correspondingly in a clockwise direction about the right-hand pin 81 against the resisting force of the spring 82 to effect unseating of the pilot valve 74 of the release valve.

If the pilot of the airplane operates the brake controlling valve device in his compartment to cause fluid under pressure to be supplied through the pipe 71 promptly after the tires of the landing wheels contact the runway and while the pilot valve 74 is unseated in the manner just described, the pressure of the fluid thus supplied into the chamber 70 of the release valve device will be effective to shift the piston valve device 60 from the position in which it is shown in Fig. 2 to the position in which the piston 61 engages the cover 65. This occurs because of the differential of fluid pressure established on the piston valve device 60 by reason of the exhaust of fluid under pressure from the interior of the tubular portion of the piston valve device resulting from unseating of the pilot valve 74, the port 73 in the tubular portion of the piston valve device 60 being sufficiently small in flow area that the flow of fluid under pressure therethrough from chamber 70 is insufficient to equalize the fluid pressures on opposite sides of the piston 61.

Piston valve 62 will thus be unseated from the annular rib seat 67 and shifted past the ports 72, so as to establish communication from the pipe 13 and the brake tube 8 connected thereto to the atmospheric exhaust passage 68, and at the same time to cut off communication from the chamber 70 to the passage 69, thereby preventing the supply of fluid under pressure to the brake tube 8 and releasing fluid under pressure, if any there be, from the brake tube 8. Application of the brake on the landing wheel is thus prevented.

After a sufficient interval of time elapses for the flywheel 22 of the rotary inertia device to be accelerated substantially to the rotational speed of the casing 17, the reactive forces exerted on the flange 35 will diminish and consequently the spring 82 will act to return the operating lever 52 of the release valve 16 to its normal central position in which the pilot valve 74 is seated. Upon the reseating of the pilot valve 74 the fluid pressures on opposite sides of the piston 61 are rapidly equalized through the port 73, with the result that the force of the spring 64 and the differential fluid pressure acting on the outer face of the piston 61 shifts piston valve device 60 back to its normal position, in which it is shown in Fig. 2. Communication is thus reestablished from the pipe 71 to the pipe 13. Consequently, fluid under pressure is supplied to the brake tube 8 to effect an application of the brake shoe 7 in accordance with the pressure of the fluid supplied under the control of the brake controlling valve device in the pilot's compartment.

It will, thus be seen that it is unnecessary for the pilot to delay effecting an application of the brakes following the instant the landing wheels first contact the runway because, as hereinbefore described, the release valve 16 is automatically controlled to prevent the supply of fluid under pressure to the brake tube 8 and the consequent brake application until inertia element or flywheel 22 of the rotary inertia device is accelerated substantially to the rotational speed of the landing wheel to render it effective for subsequent control of the brakes in the manner now to be described.

Let it now be assumed that with a brake application initiated in the manner previously described, the fluctuation of the load on the landing wheels of the airplane or the bouncing of the airplane so reduces the adhesion between the tires of the wheels and the runway that the brake application is effective to cause rotative deceleration of the landing wheels at a rapid rate characteristic of wheel slippage.

Due to the excessively rapid rate of deceleration of the landing wheel 1 and consequently of the casing 17, as the landing wheel begins to slip, the casing 17 tends to decelerate the orbit gear 29 correspondingly. However, in this case, the frictional force holding the orbit gear to the casing is limited by the frictional force exerted by the single clutch ring 41, because by reason of the tendency of the casing 17 to rotate at a slower speed than the orbit gear 29 the latches 47 slip over the lugs 51 on the clutch member 42 and consequently the clutch ring 43 is ineffective to exert a frictional retarding force on the orbit gear 29. Thus, the casing 17 will slip with respect to the orbit gear 29 so long as the frictional force exerted between the casing 17 and the orbit gear 29 through the clutch ring 41 is exceeded.

At the same time due to the retardation of the orbit gear 29 and the tendency of the inertia element or flywheel 22 to overspeed the orbit gear, that is rotate faster than the normal rate of speed with respect to the orbit gear, the reactive forces developed on the flange 35 are such as to cause rotational shifting of the flange 35 out of its normal non-rotative position, in a clockwise direction, as viewed in Fig. 4. A corresponding rotation of the operating rod 40 and rocker arm 53 in a counter-clockwise direction, as viewed in Fig. 2, will be effected, thereby exerting a pulling force on link rod 54 to cause the operating lever 52 of the release valve 16 to be rocked in a counter-clockwise direction, as seen in Fig. 2, about the left-hand pin 81 in opposition to the resistance of the coil spring 83 to effect unseating of the pilot valve 74 of the release valve. The adjustment of the spring 83 is such that as long as the landing wheel decelerates at a rapid rate characteristic of slipping, pilot valve 74 will be maintained unseated. Thus, as previously described, the unseating of pilot valve 74 while the supply of fluid under pressure into the pipe 71 is maintained under the control of the brake controlling valve device in the pilot's compartment, effects unseating of release valve 62 to cut off communication between the pipe 71 and the pipe 13 and to establish communication between the pipe 13 and the exhaust passage 68. Fluid under pressure in the brake tube 8 is thereby released rapidly to atmosphere to effect a rapid reduction in the degree of the brake application effective on the landing wheel.

Due to the prompt and rapid reduction of the braking force on the landing wheel 1 as just described, the landing wheel 1 correspondingly ceases to decelerate and, by reason of its contact with the runway, again begins to accelerate back toward a speed corresponding to the ground speed of the airplane. At this time, by reason of the action of the latches 47, the clutch member 42 is again locked for rotation with the casing and, consequently, the frictional force exerted by both clutch rings 41 and 43 is effective to cause acceleration of the inertia element or flywheel 22. It will be seen that the driving torque exerted to acelerate the inertia element or flywheel 22 is thus limited to the higher degree determined by the higher degree of frictional force exerted by both the clutch rings 41 and 43, in comparison to the relatively lower limit of driving torque exerted solely by the clutch ring 41 during deceleration of the casing 17.

It will be apparent that acceleration of the landing wheel and corresponding rotative acceleration of the casing 17 during this interval in which the landing wheel is slipping effects a reversal of the reactive forces on the flange 35 from that in effect during deceleration, and thus the operating lever 52 of the release valve 16 is again rocked in opposition to the force of spring 82 in a clockwise direction, as viewed in Fig. 2, to effect and maintain the pilot valve 74 of the release valve unseated so long as the acceleration rate of the landing wheel is sufficient to overcome the force of the spring 82. The momentary reseating of pilot valve 74 as the lever 52 of release valve device 16 passes the normal position thereof in shifting from one side of that position to the other is insufficient to effect the position of release valve 62 at that time.

As the rotational speed of the landing wheel approaches synchronism with the ground speed of the airplane, the inertia element or flywheel 22 of the rotary inertia device will have accelerated corespondingly so that the reactive forces on the flange 35 will have reduced enough that spring 82 acts to restore the lever 52 to its normal position in which the pilot valve 74 is reseated. Thus, as previously described, with the supply of fluid under pressure maintained into the pipe 71 from the brake controlling valve in the pilot's compartment, the piston valve device 60 will be instantly restored to its normal position, in which it is shown in Fig. 2, thus cutting off the exhaust of fluid under pressure from the brake tube 8 and restoring the communication through which fluid under pressure is supplied from the pipe 71 to the pipe 13 and the brake tube 8. Reapplication of the brake on the landing wheel is thus effected substantially at the time the landing wheel is synchronized with the ground speed of the airplane.

It will be understood that by employing a brake controlling valve in the pilot's compartment of the self-lapping type, fluid at a pressure determined by the position of the brake controlling handle is always available notwithstanding the venting of fluid under pressure from the brake tube. Consequently, the degree of brake application restored is always determined by the position of the operating handle of the brake controlling valve device.

In the event that brake reapplication on the landing wheel again initiates a slipping condition of the wheel, the above operation will be repeated so that at no time are the landing wheels permitted to attain a locked or slipping condition.

After an airplane comes to a stop following the landing, the brakes may be released at any time by simply restoring the brake controlling valve device in the pilot's compartment to its release position in which fluid under pressure is released from the brake tube 8 reversely through the pipe 13 and pipe 71 and exhausted to atmosphere at the brake controlling valve device. It will be seen that whenever the wheels of the airplane cease rotation due to stopping of the plane on the ground, no reactive forces remain on flange 35 and consequently springs 82 and 83 restore lever 52 to its normal centered position, in which pilot valve 74 is seated. Thus piston valve 62 of the release valve device 16 is automatically restored to its normal seated position, in which it is shown in Fig. 2, thereby establishing the communication through which fluid under pressure may be supplied to or released from the brake tube 8 under the control of the brake controlling valve device operated by the pilot of the airplane.

Having now described my invention, what I claim as new and desire to secure by Letters Patent, is:

1. An inertia type wheel slip detector device comprising a rotative housing adapted to be rotated according to the rotation of a vehicle wheel, a rotative mass, torque transmission means for driving said mass from said rotative housing, said transmission means including a multiple clutch device one portion of which is in driving engagement at all times and another portion of which is in driving engagement only when the rotation of said mass is accelerated.

2. An inertia type wheel slip detector device comprising a rotative housing adapted to be rotated according to the rotation of a vehicle wheel, a rotative mass, power transmission means for driving said mass from said rotative housing, said power transmission means including a dual friction type clutch, one clutch portion of which is in driving engagement at all times and a second clutch portion of which is in driving engagement only when the rotation of said mass is accelerated, and adjustable means for selectively causing said second portion of said clutch to be actuable into driving engagement for one direction of rotation of said housing or for the opposite direction of rotation of said housing.

3. A control mechanism comprising a rotary housing, a rotary inertia mass enclosed in said housing, power transmission means for operatively connecting said housing to said inertia mass for accelerating and decelerating said mass to rotative speeds corresponding to the rotative speed of said housing, said transmission means including an orbit gear rotatively mounted in said housing, clutch means for frictionally associating said orbit gear and said housing for rotation together, gear mechanism meshing with said orbit gear and providing a driving connection from said orbit gear to rotate said inertia mass, means cooperating with said clutch means for limiting to one degree the frictional force applied by said clutch means to hold said orbit gear against rotation with respect to said housing upon acceleration of the housing and for limiting to a different degree the frictional force applied by said clutch means to hold said orbit gear against rotation with respect to said housing upon deceleration of said housing.

4. A control mechanism comprising a rotary housing, a rotary inertia mass enclosed in said housing, power transmission means for operatively connecting said housing to said inertia mass for accelerating and decelerating said mass to rotative speeds corresponding to the rotative speed of said housing, said transmission means including an orbit gear rotatably carried in said housing, two clutch members, resilient means active to bias said clutch members into frictional contact with said orbit gear, one of said clutch members frictionally engaging the housing at all times and being constantly effective to transmit a driving force from said housing to drive said orbit gear, and means for locking the other of said clutch members to said housing upon relative movement of the orbit gear and housing occurring as an incident to the acceleration of the housing.

5. A control mechanism comprising a rotary housing, a rotary inertia mass enclosed in said housing, power transmission means for operatively connecting said housing to said inertia mass for accelerating and decelerating said mass to rotative speeds corresponding to the rotative speed of said housing, said transmission means including an orbit gear carried in said housing, a clutch member interposed between the housing and the orbit gear effective to transmit driving force from said housing to accelerate or to retard said orbit gear, and auxiliary clutch means effective only to transmit a driving force from said housing to accelerate said orbit gear.

6. A control mechanism comprising a rotary housing, a rotary inertia mass enclosed in said housing, power transmission means for operatively connecting said housing to said inertia mass for accelerating and decelerating said mass to rotative speeds corresponding to the rotative speed of said housing, said transmission means including an orbit gear carried in said housing, two annular clutch members carried by the housing and frictionally engaging opposite sides of said orbit gear, one of said clutch members having peripheral projections, a cover adapted to be secured to said housing in either of two reversed positions, and latch means carried by said cover and biased to engage the projections on said one of the clutch members whereby to provide a positive lock for driving said clutch member from said housing only in one direction of rotation of the housing with said cover in one position and a positive lock for driving said clutch member from said housing only in the opposite direction of rotation of the housing with the said cover in the other of its said two positions.

7. A control mechanism comprising a rotary housing, a rotary inertia mass enclosed in said housing, power transmission means for operatively connecting said housing to said inertia mass for accelerating and decelerating said mass to rotative speeds corresponding to the rotative speed corresponding to the rotative speed of said housing, said transmission means including an orbit gear carried in said housing, two annular clutch members carried by said housing and frictionally engaging opposite sides respectively of said orbit gear, resilient means effective to cause both clutch members to continuously engage said orbit gear, one of said clutch members being continuously effective to drive said orbit gear from said housing, the other of said clutch members having a latching surface, a latch normally biased to engage the latching surface of said clutch member whereby to provide a positive lock for driving said clutch member from said housing upon acceleration of the housing and free rotation of the housing relative to said clutch member upon deceleration of the housing.

8. A control mechanism comprising a rotary housing, a rotary inertia mass enclosed in said housing, power transmission means for operatively connecting said housing to said inertia mass for accelerating and decelerating said mass to rotative speeds corresponding to the rotative speed of said housing, said transmission means including an orbit gear carried in said housing, clutch means comprising an annular clutch member on each side of said orbit gear, resilient means active to bias said annular clutch members into frictional contact with said orbit gear, one of said annular clutch members engaging the housing at all times and being effective to drive said mass, means operative as an incident to acceleration of said housing for locking the other of said clutch members to said housing to cause the said other clutch member to rotate with the housing and being ineffective to lock said other of said clutch members to the housing upon deceleration of said housing.

9. A control mechanism comprising a rotary housing, a rotary inertia mass enclosed in said housing, an orbit gear rotatively carried in said housing, a first annular clutch member frictionally cooperating with the housing and one side of said orbit gear, a second clutch member frictionally cooperating with the other side of said orbit gear, resilient means active to bias said annular clutch members into frictional engagement with their respective sides of said orbit gear and also to bias said first clutch member into frictional contact with the said housing, means operative upon acceleration of said housing for locking the said second clutch member for rotation with said housing and operative upon deceleration of said housing for unlocking said second clutch member from said housing to permit relative rotary movement therebetween, a plurality of planetary gears cooperating with said orbit gear and arranged to drive said inertia mass upon rotation of the orbit gear, rotary means supported in said housing for carrying said planetary gears, resilient means biasing said rotary member to a normal non-rotative position and yieldable responsively to the reactive forces exerted on the rotary member incident to acceleration or deceleration of the housing to permit rotary movement of the rotary member to one or the other side of said normal position, and control means actuated responsively to rotary displacement of the rotary member out of its normal position.

10. An inertia type wheel slip detector device comprising, in combination, a rotative housing, a rotative inertia mass, and transmission means for transmitting a driving force from said housing to said mass, said transmission means including a first drive means effective at all times to transmit an accelerating or decelerating force from said housing to said mass and a second drive means effective only to transmit an accelerating force from said housing to said mass.

11. An inertia type wheel slip detector device comprising, in combination, a rotative housing, a rotative inertia mass, and transmission means for transmitting a driving force from said housing to said mass, said transmission means including a first drive means effective at all times to transmit an accelerating or decelerating force from said housing to said mass, a second drive means, and means effective to cause said second drive means to be effective only to transmit an accelerating force from said housing to said mass.

RANKIN J. BUSH.

REFERENCES CITED

The following references are of record in the file of this patent:

UNITED STATES PATENTS

| Number | Name | Date |
|---|---|---|
| 2,159,778 | Bush | May 23, 1939 |
| 2,393,031 | Eksergian | Jan. 15, 1946 |
| 2,491,666 | Keller | Dec. 20, 1949 |